(12) United States Patent
Kotake

(10) Patent No.: US 9,605,961 B2
(45) Date of Patent: Mar. 28, 2017

(54) INFORMATION PROCESSING APPARATUS THAT PERFORMS THREE-DIMENSIONAL SHAPE MEASUREMENT, INFORMATION PROCESSING METHOD, AND STORAGE MEDIUM

(71) Applicant: CANON KABUSHIKI KAISHA, Tokyo (JP)

(72) Inventor: Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 13/854,413

(22) Filed: Apr. 1, 2013

(65) Prior Publication Data

US 2013/0258060 A1 Oct. 3, 2013

(30) Foreign Application Priority Data

Apr. 3, 2012 (JP) ................. 2012-084909

(51) Int. Cl.
*G01C 11/02* (2006.01)
*G01B 11/25* (2006.01)

(52) U.S. Cl.
CPC ............ *G01C 11/025* (2013.01); *G01B 11/25* (2013.01)

(58) Field of Classification Search
CPC ............................... G01C 11/025; G01C 11/02
(Continued)

(56) References Cited

U.S. PATENT DOCUMENTS 6,611,343 B1 8/2003 Frankowski
7,502,125 B2 3/2009 Suzuki
(Continued)

FOREIGN PATENT DOCUMENTS

CN 1534272 A 10/2004
CN 1590958 A 3/2005
(Continued)

OTHER PUBLICATIONS

German office action cited in German counterpart application No. DE102013205762.8, dated Jan. 8, 2014.
(Continued)

*Primary Examiner* — Tung Vo
*Assistant Examiner* — Zaihan Jiang
(74) *Attorney, Agent, or Firm* — Rossi, Kimms & McDowell LLP

(57) ABSTRACT

Information processing apparatus that performs three-dimensional shape measurement with high accuracy at high speed while taking into account lens distortion of a projection device. An image input unit of an information processing apparatus inputs image data of a measurement object photographed by a camera in a state where a predetermined pattern light is projected by a projector. An association unit calculates associations between coordinates on the image data of the measurement object and coordinates on image data of the predetermined pattern light. A three-dimensional coordinate calculation unit calculates a viewing vector of the camera from which lens distortion thereof has been eliminated and a viewing vector of the projector to which lens distortion thereof has been added. The calculation unit calculates coordinates of a point, in a three-dimensional space, of intersection between the camera viewing vector and the projector viewing vector, for each association.

9 Claims, 4 Drawing Sheets

(58) Field of Classification Search
USPC .......................................................... 348/46
See application file for complete search history.

(56) References Cited

U.S. PATENT DOCUMENTS

| | | | |
|---|---|---|---|
| 2004/0246496 A1* | 12/2004 | Yoshida | G01B 11/254 356/605 |
| 2007/0031029 A1 | 2/2007 | Sasaki | |
| 2007/0206204 A1 | 9/2007 | Jia et al. | |
| 2009/0097039 A1* | 4/2009 | Kawasaki et al. | 356/603 |
| 2009/0161945 A1* | 6/2009 | Morgan-Mar et al. | 382/154 |
| 2010/0046801 A1 | 2/2010 | Ishiyama | |
| 2010/0177192 A1 | 7/2010 | Ishigaki | |
| 2010/0177319 A1* | 7/2010 | Towers et al. | 356/511 |
| 2010/0222684 A1 | 9/2010 | Hatzilias et al. | |
| 2010/0277571 A1* | 11/2010 | Xu et al. | 348/47 |
| 2010/0290060 A1* | 11/2010 | Mohazzab et al. | 356/492 |
| 2011/0096182 A1* | 4/2011 | Cohen et al. | 348/222.1 |
| 2011/0164114 A1* | 7/2011 | Kobayashi | H04N 13/0253 348/46 |
| 2012/0281240 A1* | 11/2012 | Cohen et al. | 356/610 |

FOREIGN PATENT DOCUMENTS

| | | |
|---|---|---|
| CN | 100507441 C | 7/2009 |
| CN | 101782525 B | 2/2012 |
| DE | 102010000075 A1 | 10/2010 |
| JP | 2004317495 A | 11/2004 |

OTHER PUBLICATIONS

Valkenburg, et al., "Accurate 3D Measurement Using a Structured Light System", Image and Vision Computing, 1997.
Chinese Office Action issued in Chinese counterpart application No. CN201310116320.9, dated Aug. 4, 2015. English translation provided.
Office Action issued in Japanese Appln. No. 2012-084909, mailed Mar. 1, 2016. English translation provided.
Office Action issued in Japanese Appln. No. 2012-084909, mailed Mar. 1, 2016.
Combined Search and Examination Report for corresponding GB1305704.7, mail date Sep. 26, 2013.

* cited by examiner

INFORMATION PROCESSING APPARATUS THAT PERFORMS THREE-DIMENSIONAL SHAPE MEASUREMENT, INFORMATION PROCESSING METHOD, AND STORAGE MEDIUM

BACKGROUND OF THE INVENTION

Field of the Invention

The present invention relates to a technique for measuring a three-dimensional shape of a measurement object.

Description of the Related Art

Three-dimensional shape measurement of an object surface using an image is used for various purposes, such as generation of a three-dimensional model based on a real thing, and measurement of a position and orientation of an object. In the techniques of three-dimensional shape measurement using an image, an active method in which pattern light referred to as structured light is irradiated is widely used because of its high reliability in measurement. As a device that performs irradiation of such pattern light, a projector is generally used which is a projection image display device. Typical examples of the three-dimensional shape measurement method using a projector include a space coding method and a phase shift method. The space coding method and the phase shift method are methods of performing three-dimensional shape measurement by projecting two-dimensional striped pattern light.

In the space coding method, light beams different in binary striped pattern are projected in time series to thereby stably associate coordinates on photographed image data with coordinates on image data projected from the projector. In the phase shift method, a plurality of striped pattern light beams which are shifted in phase of a sine-wave striped pattern are projected, and a change in density value of each pixel on the photographed image data is observed to thereby associate coordinates on photographed image data with coordinates on image data projected from the projector.

A camera and a projector used in the above-described method of projecting the striped pattern light are devices that input and output light through lenses. Therefore, distortion caused when light passes through a lens, referred to as distortion aberration, is added to image data photographed by the camera and image data output from the projector. To perform three-dimensional shape measurement with high accuracy, it is necessary to properly take into account an influence of such lens distortion. In correcting the lens distortion of the camera, it is a general practice that a distortion parameter is calibrated in advance, and two-dimensional coordinates on the photographed image data are corrected to coordinates without distortion in the three-dimensional shape measurement, using the distortion parameter. As to the lens distortion of the projector as well, by performing calibration in advance, it is also possible to perform the correction, based on a result of the calibration, similarly to the camera.

However, in the above-mentioned methods using the striped pattern light, such as the space coding method and the phase shift method, it is a general practice that striped pattern light substantially orthogonal to a direction of a base line connecting the camera and the projector is projected by the projector, for three-dimensional shape measurement. Therefore, to correct the lens distortion of the projector, although not necessary for the three-dimensional shape measurement, it is required to project pattern light orthogonal to the striped pattern light necessary for the three-dimensional shape measurement. On the other hand, R. J. Valkenburg and A. M. McIvor, "Accurate 3D measurement using a structured light system," Image and Vision Computing, vol. 16, no. 2, pp. 99-110, 1998 discloses a method of correcting lens distortion of the projector without projecting unnecessary pattern light, by optimizing provisional three-dimensional coordinates calculated as the coordinates that is calculated ignoring lens distortion such that they satisfy a projection model including lens distortion.

However, projection of the pattern light orthogonal to the striped pattern light required for the three-dimensional shape measurement so as to correct the lens distortion of the projector naturally increases the number of pattern light beams to be projected. This causes a problem that a time required for photographing image data and processing image data is increased. On the other hand, in the method disclosed in R. J. Valkenburg and A. M. McIvor, "Accurate 3D measurement using a structured light system," Image and Vision Computing, vol. 16, no. 2, pp. 99-110, 1998, although the measurement time is not increased due to projection and photographing of pattern light separately performed, it is required to carry out processing, such as calculating provisional three-dimensional coordinates, and performing non-linear optimization of the three-dimensional coordinates. These processing operations are required to be performed with respect to a lot of points on the image data, which brings about a problem that calculation is required to be executed an enormous number of times and hence it takes a very long time period to complete the calculation.

SUMMARY OF THE INVENTION

The present invention provides an information processing apparatus that performs three-dimensional shape measurement with high accuracy at high speed while taking into account lens distortion of a projection device, using predetermined pattern light of which the two-dimensional position on an image is not uniquely determined.

In a first aspect of the present invention, there is provided an information processing apparatus comprising an input unit configured to input image data of a target object, onto which a predetermined pattern image is projected by a projection apparatus and which has then been photographed by an imaging apparatus, an association unit configured to provide associations between coordinates on the image data of the target object with coordinates on image data of the predetermined pattern image, a first viewing vector-deriving unit configured to derive a viewing vector on the imaging apparatus-side which has been corrected with respect to a lens distortion of the imaging apparatus, a second viewing vector-deriving unit configured to derive a viewing vector on the projection apparatus-side which has not been corrected with respect to a lens distortion of the projection apparatus, and an intersection coordinate-deriving unit configured to derive coordinates of a point, in a three-dimensional space, of intersection between the viewing vector on the imaging apparatus-side which has been corrected with respect to the lens distortion of the imaging apparatus and the viewing vector on the projection apparatus-side which has not been corrected with respect to the lens distortion of the projection apparatus, for each of the associations provided by the association unit.

In a second aspect of the present invention, there is provided an information processing method executed by an information processing apparatus information processing apparatus, comprising inputting image data of a target object, onto which a predetermined pattern image is projected by a projection apparatus and which has then been photographed by an imaging apparatus, providing associations between coordinates on the image data of the target object with coordinates on image data of the predetermined pattern image, deriving a viewing vector on the imaging apparatus-side which has been corrected with respect to a lens distortion of the imaging apparatus, deriving a viewing vector on the projection apparatus-side which has not been corrected with respect to a lens distortion of the projection apparatus, and deriving coordinates of a point, in a three-dimensional space, of intersection between the viewing vector on the imaging apparatus-side which has been corrected with respect to the lens distortion of the imaging apparatus and the viewing vector on the projection apparatus-side which has not been corrected with respect to the lens distortion of the projection apparatus, for each of the provided associations.

In a third aspect of the present invention, there is provided a non-transitory storage medium storing a program for causing a computer to function as each unit of an information processing apparatus, the program comprising: inputting image data of a target object, onto which a predetermined pattern image has been projected by a projection apparatus and which has then been photographed by an imaging apparatus; providing associations between coordinates on the image data of the target object with coordinates on image data of the predetermined pattern image; deriving a viewing vector on the imaging apparatus-side which has been corrected with respect to a lens distortion of the imaging apparatus; deriving a viewing vector on the projection apparatus-side which has not been corrected with respect to a lens distortion of the projection apparatus; and deriving coordinates of a point, in a three-dimensional space, of intersection between the viewing vector on the imaging apparatus-side which has been corrected with respect to the lens distortion of the imaging apparatus and the viewing vector on the projection apparatus-side which has not been corrected with respect to the lens distortion of the projection apparatus, for each of the provided associations.

In a fourth aspect of the present invention, there is provided an information processing apparatus comprising a projection unit configured to project a pattern image which varies in luminance in a predetermined direction onto a target object, an imaging unit configured to photograph an image of the target object onto which the pattern image has been projected, and a deriving unit configured to derive a distance from the projection unit or the imaging unit to the target object, by associating coordinates on the photographed image and coordinates of the pattern image in the projection unit, wherein the deriving unit includes a first correction unit configured to correct the coordinates on the photographed image based on a distortion parameter of the imaging unit, which is determined in advance, and a second correction unit configured to correct at least one coordinate component on the pattern image, based on the distortion parameter of the projection unit, which is determined in advance, the corrected coordinates on the photographed image, and constraint conditions determined from an arrangement of the projection unit and the imaging unit.

In a fifth aspect of the present invention, there is provided an information processing method of an information processing apparatus including a projection unit configured to project a pattern image which varies in luminance in a predetermined direction onto a target object, and an imaging unit configured to photograph an image of the target object onto which the pattern image has been projected, the information processing method comprising deriving a distance from the projection unit or the imaging unit to the target object, by associating coordinates on the photographed image and coordinates of the pattern image in the projection unit, correcting the coordinates on the photographed image based on a distortion parameter of the imaging unit, which is determined in advance, and correcting at least one coordinate component on the pattern image, based on the distortion parameter of the projection unit, which is determined in advance, the corrected coordinates on the photographed image, and constraint conditions determined from an arrangement of the projection unit and the imaging unit.

In a sixth aspect of the present invention, there is provided a non-transitory storage medium storing a program for causing a computer to function as each unit of an information processing apparatus including a projection unit configured to project a pattern image which varies in luminance in a predetermined direction onto a target object, and an imaging unit configured to photograph an image of the target object onto which the pattern image has been projected, the program comprising: deriving a distance from the projection unit or the imaging unit to the target object, by associating coordinates on the photographed image and coordinates of the pattern image in the projection unit; correcting the coordinates on the photographed image based on a distortion parameter of the imaging unit, which is determined in advance; and correcting at least one coordinate component on the pattern image, based on the distortion parameter of the projection unit, which is determined in advance, the corrected coordinates on the photographed image, and constraint conditions determined from an arrangement of the projection unit and the imaging unit.

According to the present invention, it is possible to perform three-dimensional shape measurement with high accuracy at high speed while taking into account lens distortion of a projecting device, using predetermined pattern light of which the two-dimensional position on an image is not unconditionally determined.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

First, a description will be given of a first embodiment of the present invention. In the first embodiment of the present invention, a description will be given of a measurement method that takes into account lens distortion of a projector when performing tree-dimensional shape measurement using a space coding method.

Figure 1:
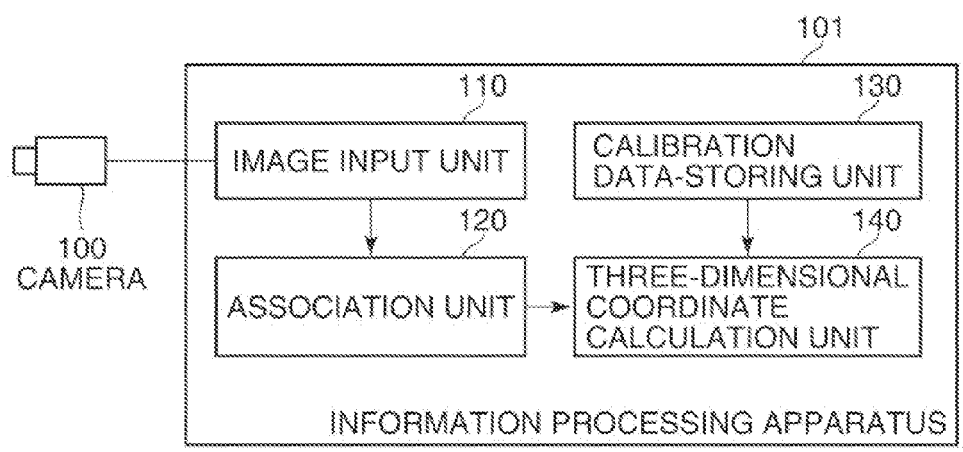
FIG. 1 is a diagram of the configuration of an information processing apparatus according to a first embodiment of the present invention.

FIG. 1 is a diagram of the configuration of an information processing apparatus according to the first embodiment of the present invention. As shown in FIG. 1, the information processing apparatus, denoted by reference numeral 101, includes an image input unit 110, an association unit 120, a calibration data-storing unit 130, and a three-dimensional coordinate calculation unit 140. Further, a camera 100 is connected to the information processing apparatus 101. Note that the camera 100 is an example of an imaging apparatus.

Figure 2:
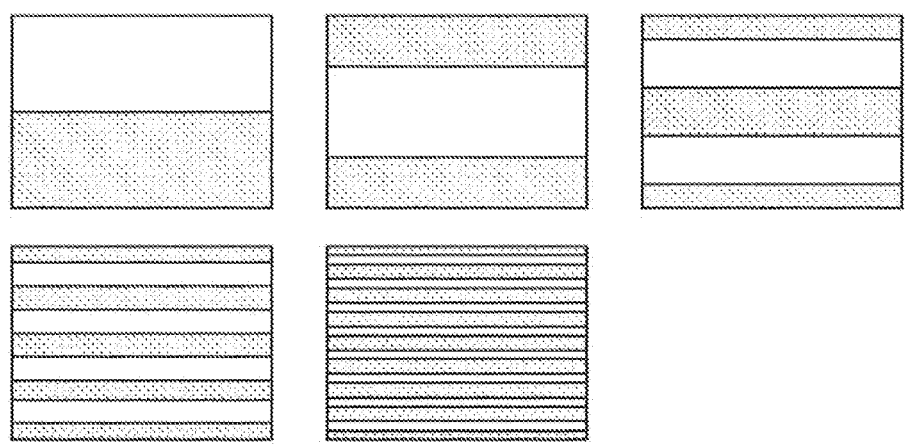
FIG. 2 is a diagram of striped pattern light irradiated from a projector.

The image input unit 110 inputs image data photographed by the camera 100. In the space coding method, for each operation of the three-dimensional shape measurement, image data is photographed each time one of a plurality of binary striped pattern lights shown in FIG. 2 is projected, and hence a plurality of image data items are input to the image input unit 110.

In the present embodiment, to estimate a boundary between bit patterns on the photographed image data, not only horizontally striped pattern lights that represent a 5-bit gray code but also their inverted pattern in which the black and white are switched are projected.

Figure 3:
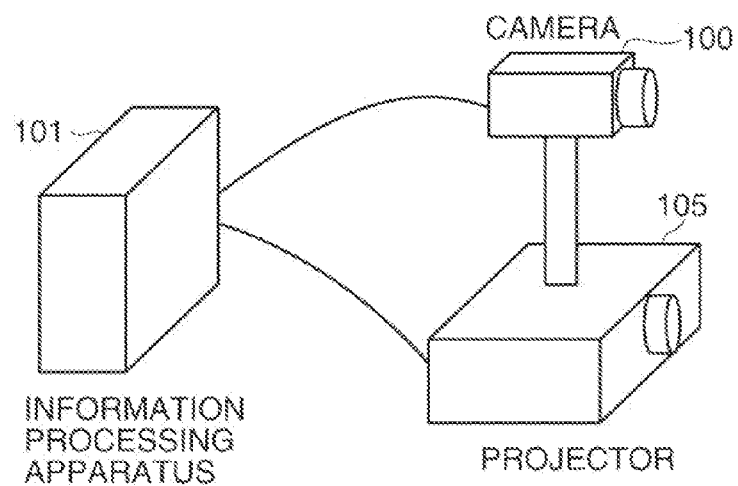
FIG. 3 is a view of the arrangement of an image processing system including the information processing apparatus according to the first embodiment of the present invention.

FIG. 3 is a view of the arrangement of an image processing system including the information processing apparatus 101 according to the present embodiment. In the image processing system shown in FIG. 3, the camera 100 and the projector, denoted by reference numeral 105, are fixed with respect to each other, and are connected to the information processing apparatus 101, respectively. The information processing apparatus 101 sends a command to the projector 105 for projection of one of the striped pattern lights shown in FIG. 2, and then sends a command to the camera 100 for photographing image data. Note that the projector 105 is an example of the projection apparatus.

The association unit 120 associates each two-dimensional coordinates on a plurality of image data items input to the image input unit 110 with the corresponding geometric primitive on the image data that is projected by the projector 105. In the present embodiment, the geometric primitive is a horizontal straight line and the association unit 120 associates each two-dimensional coordinates with the coordinate of the corresponding line in the vertical direction on the image data of the striped pattern. The calibration data-storing unit 130 stores internal parameters of the camera 100 and the projector 105, which are calibrated in advance, and relative position and orientation of the camera 100 and the projector 105. The internal parameters include a focal length, a principal point position, and distortion parameters (a radial distortion coefficient and a tangential distortion coefficient, in the present embodiment). The internal parameters of the camera 100 and the projector 105 are calibrated in advance by the Zhang method (Z. Zhang, "A flexible new technique for camera calibration," IEEE Transactions on Pattern Analysis and Machine Intelligence, vol. 22, no. 11, pp. 1330-1334, 2000). The relative position and orientation between the camera 100 and the projector 105 are calculated based on the relative position and orientation between a calibration pattern and camera and the relative position and orientation between the calibrated pattern and projector obtained when the internal parameters are calibrated.

The three-dimensional coordinate calculation unit 140 calculates three-dimensional coordinates using the calibration data stored in the calibration data-storing unit 130 with respect to each association of the two-dimensional coordinates on the photographed image data with the vertical coordinate on the image data of the striped pattern, obtained by the association unit 120.

Figure 4:
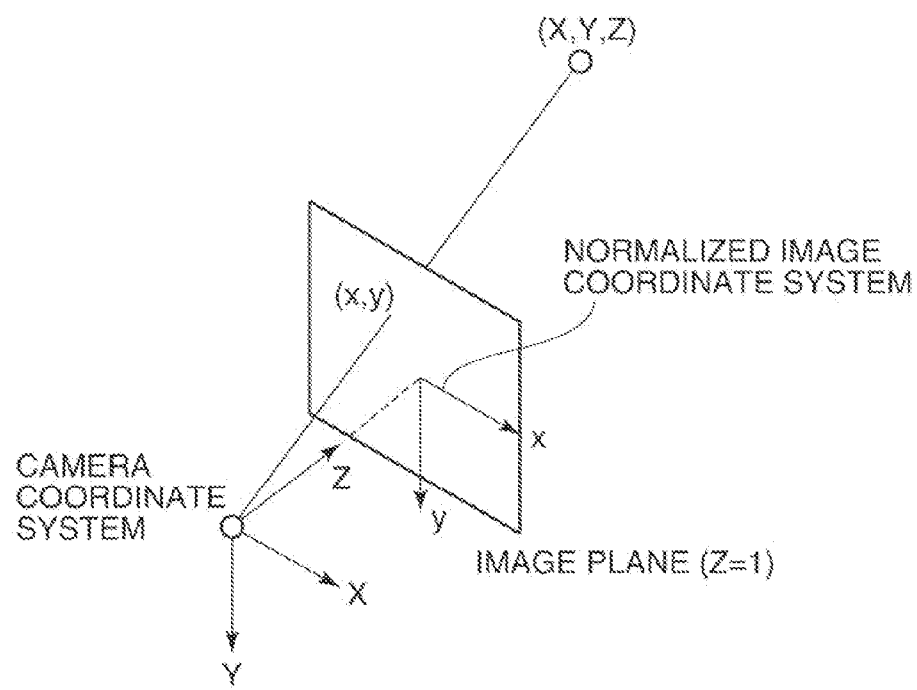
FIG. 4 is a diagram useful in explaining a projection model of a camera.

Next, a description will be given of projection models of the camera 100 and the projector 105 in the present embodiment. First, the projection model of the camera 100 will be described. As shown in FIG. 4, a camera coordinate system (three-dimensional) is set such that a Z-axis coincides with an optical axis, and an X-axis and a Y-axis are parallel to the horizontal direction and the vertical direction of the image data, respectively. A point having three-dimensional coordinates of (X, Y, Z) in the camera coordinate system is projected using a pinhole camera model onto normalized image coordinates expressed by the following equations (1):

$$x = \frac{X}{Z}$$
$$y = \frac{Y}{Z} \tag{1}$$

In the present embodiment, the normalized image coordinates represent a position on an image plane when the image plane is set at a position of Z=1 in the camera coordinate system. The origin of the normalized image coordinate system is a point of intersection of the optical axis (Z-axis) and the image plane, and the X-axis and the Y-axis are parallel to the horizontal direction and the vertical direction of the image data, respectively. The actually observed normalized image coordinates (x', y') are obtained by adding components of the lens distortion to (x, y), as expressed by the following equations (2):

$$x' = x\{1 + k_{c1}(x^2+y^2) + k_{c2}(x^2+y^2)^2\} + 2p_{c1}xy + p_{c2}(3x^2+y^2)$$

$$y' = y\{1 + k_{c1}(x^2+y^2) + k_{c2}(x^2+y^2)^2\} + p_{c1}(x^2+3y^2) + 2p_{c2}xy \tag{2}$$

In the above equations, $k_{c1}$ and $k_{c2}$ are distortion coefficients for third-order and fifth-order radial distortions, respectively, and $p_{c1}$ and $p_{c2}$ are tangential distortion coefficients. Note that the lens distortion model is not limited to this. Although the equations (2) takes into account distortions up to the fifth-order circumferential distortion, the lens distortion model may be e.g. of a third-order or seventh-order distortion. Further, although the equation 2 takes into account a circumferential distortion, it may be assumed that there is no tangential distortion. That is, any other model may be used insofar as the model expresses the normalized image coordinates (x', y') having distortions added thereto as a function of the normalized image coordinates (x, y) before addition of the distortion. The coordinates (pixel coordinates) ($u_c$, $v_c$) on the actual image data of a point having normalized image coordinates of (x', y') are expressed by the following equations (3):

$$u_c = f_{cx}x' + c_{cx}$$

$$v_c = f_{cy}y' + c_{cy} \tag{3}$$

In the above equations, $f_{cx}$, and $f_{cy}$ each represent a focal length, and $c_{cx}$ and $c_{cy}$ each represent a position of the principal point. As mentioned above, the internal parameters $f_{cx}$, $f_{cy}$, $c_{cx}$, $c_{cy}$, $k_{c1}$, $k_{c2}$, $p_{c1}$, and $p_{c2}$ of the camera 100 are calibrated in advance.

Figure 5A:
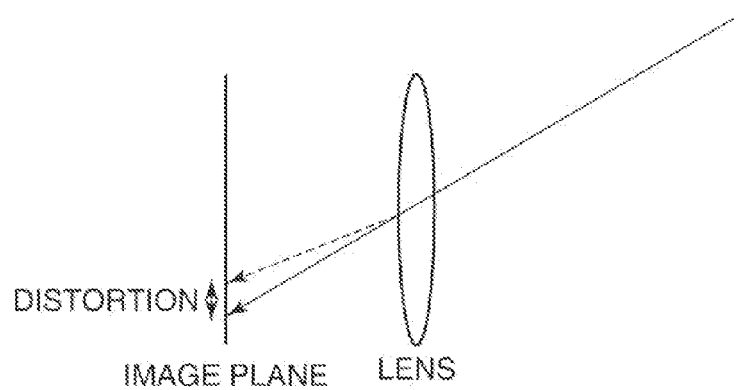
FIGS. 5A and 5B are diagrams useful in explaining a difference in lens distortion between the camera and the projector.
Figure 5B:
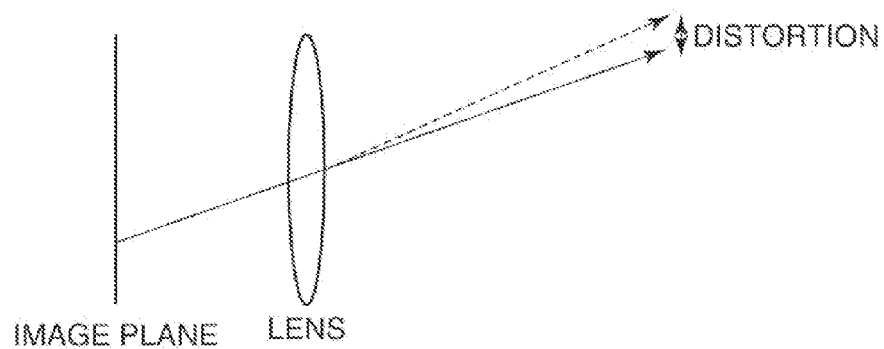

Next, the projection model of the projector 105 will be described. When the projector 105 is regarded as an optical system using a lens, the different point between the camera 100 and the projector 105 is only that an image is input or output through a lens. Therefore, the projection model of the projector 105 can be basically described using the same model as that of the camera 100. FIGS. 5A and 5B are diagrams useful in explaining the difference in lens distortion between the camera 100 and the projector 105. FIG. 5A illustrates distortion of image data photographed by the camera 100, and FIG. 5B illustrates distortion of image data projected by the projector 105. As shown in FIGS. 5A and 5B, in the case of the projector 105, inversely from the camera 100 to which an image is input through a lens, an image is output through a lens, and hence the relationship between the normalized image coordinates (x', y') with distortion and the normalized image coordinates (x, y) without distortion of the projector 105 is inverse to that of the camera 100. Therefore, the relationship between (x', y') and (x, y) is expressed by the following equations (4):

$$x = x'\{1 + k_{p1}(x'^2 + y'^2) + k_{p2}(x'^2 + y'^2)^2\} + 2p_{p1}x'y' + p_{p2}(3x'^2 + y'^2)$$
$$y = y'\{1 + k_{p1}(x'^2 + y'^2) + k_{p2}(x'^2 + y'^2)^2\} + p_{p1}(x'^2 + 3y'^2) + 2p_{p2}x'y'$$

(4)

The internal parameters $f_{px}$, $f_{py}$, $c_{px}$, $c_{py}$, $k_{p1}$, $k_{p2}$, $p_{p1}$, and $p_{p2}$ of the projector 105 are also calibrated in advance similarly to the internal parameters of the camera 100. In calibration of the internal parameters of the projector 105, striped pattern lights in both of the horizontal and vertical directions are projected onto a calibration pattern having a planar shape to thereby associate each coordinates on the calibration pattern with each coordinates on the image projected from the projector 105. The calibration of the internal parameters is an operation performed before the actual measurement, and there is relatively enough time for the operation, and hence it is possible to project the striped pattern lights in both of the horizontal and vertical directions. On the other hand, the present embodiment relates to projector distortion correction performed during actual execution of three-dimensional shape measurement using the internal parameters which have been calibrated in advance, and the object is to make the pattern light to be projected as less as possible so as to increase the speed of processing. Similarly to the distortion model of the camera 100, any other model may be used insofar as the model expresses the normalized image coordinates (x, y) before addition of the distortion as a function of the normalized image coordinates (x', y') having distortions added thereto.

Figure 6:
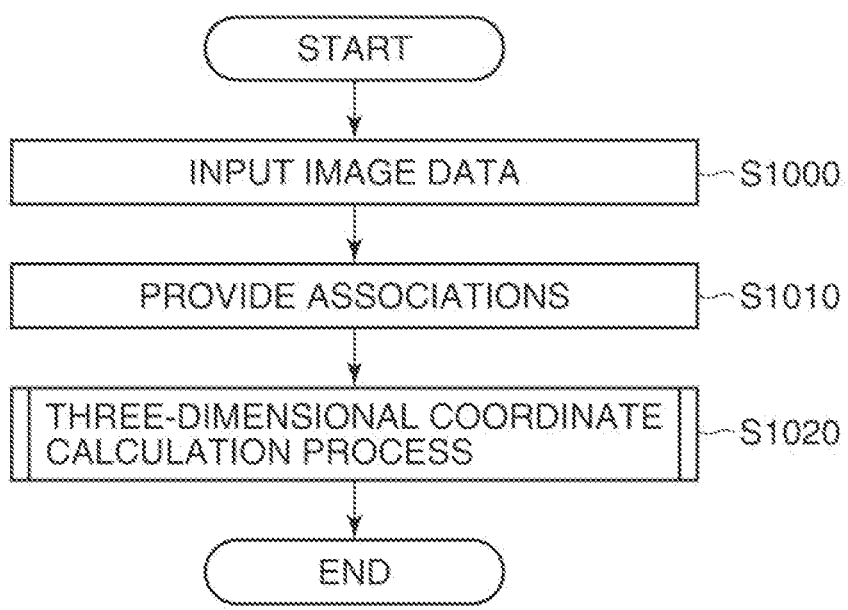
FIG. 6 is a flowchart of a three-dimensional shape measurement process executed by the information processing apparatus.

FIG. 6 is a flowchart of a three-dimensional shape measurement process executed by the information processing apparatus according to the first embodiment of the present invention. Hereafter, the three-dimensional shape measurement process in the first embodiment will be described with reference to FIG. 6.

In a step S1000, the image input unit 110 inputs image data of a scene or an object, illuminated by striped pattern lights, which was photographed by the camera 100. As described hereinabove, in the space coding method, the object is illuminated by a plurality of striped pattern lights for one measurement, and hence a plurality of image data items are input in this step.

In a step S1010, the association unit 120 calculates a set of associations between the two-dimensional coordinates on the image data input in the step S1000 and the vertical coordinates on the image data of the striped pattern. More specifically, the association unit 120 calculates a bit pattern (five bits in the present embodiment) for each pixel by binarizing each item of input image data. The association unit 120 associates each two-dimensional coordinates on the photographed image data and each vertical coordinate on the image data of the striped pattern by using the calculated bit pattern. Next, the association unit 120 estimates the two-dimensional coordinates ($u_c$, $v_c$) of a boundary part at which the bit pattern on the photographed image data changes. As disclosed in e.g. Inokuchi, Sato, the three-dimensional image measurement, Shokodo, 1990, the estimation of the boundary part is performed based on a gray value profile determined from the image data photographed in a state illuminated by the negative striped pattern light and the image data photographed in a state illuminated by the positive striped pattern light. Finally, with respect to all points of the boundary part, the association unit 120 determines the vertical coordinate $v_p$ on the image data of the striped pattern based on each adjacent bit patterns.

In a step S1020, the three-dimensional coordinate calculation unit 140 performs three-dimensional coordinate calculation process to thereby calculate the three-dimensional coordinates of each point with reference to the camera coordinate system, based on the association of the two-dimensional coordinates ($u_c$, $v_c$) on the photographed image data and the vertical coordinate $v_p$ on the image data of the striped pattern. The three-dimensional coordinates of each point are calculated as the coordinates of a point of intersection between a viewing vector of the camera 100 (hereinafter referred to as the camera viewing vector) with a viewing vector of the projector 105 (hereinafter referred to as the projector viewing vector). In this step, the viewing vector represents a three-dimensional vector connecting between the optical center of the camera 100 (or the projector 105) and a point on the image. The camera viewing vector (or the projector viewing vector) in the camera coordinate system (or the projector coordinate system) can be expressed as $[xy1]^t$ by using the normalized image coordinates (x, y). When an image is projected in a space by the projector 105, distortion caused by the lens is added to the direction of output light, and hence the projector viewing vector becomes a vector to which the lens distortion has been added. On the other hand, it is necessary to use a vector along which light reflected from the space enters the camera 100, as the camera viewing vector, and hence the camera viewing vector is required to be a vector from which the lens distortion is eliminated. When striped pattern light is projected by the projector 105, the association performed in the step S1010 makes it possible to determine only each coordinate in one direction (each vertical coordinate in the present embodiment) on the striped pattern, and hence the projector viewing vector cannot be determined. In the present embodiment, by solving both of an equation obtained from epipolar constraints between the camera 100 and the projector 105 and an equation obtained from the lens distortion model of the projector 105, as simultaneous equations, the projector viewing vector is determined.

Figure 7:
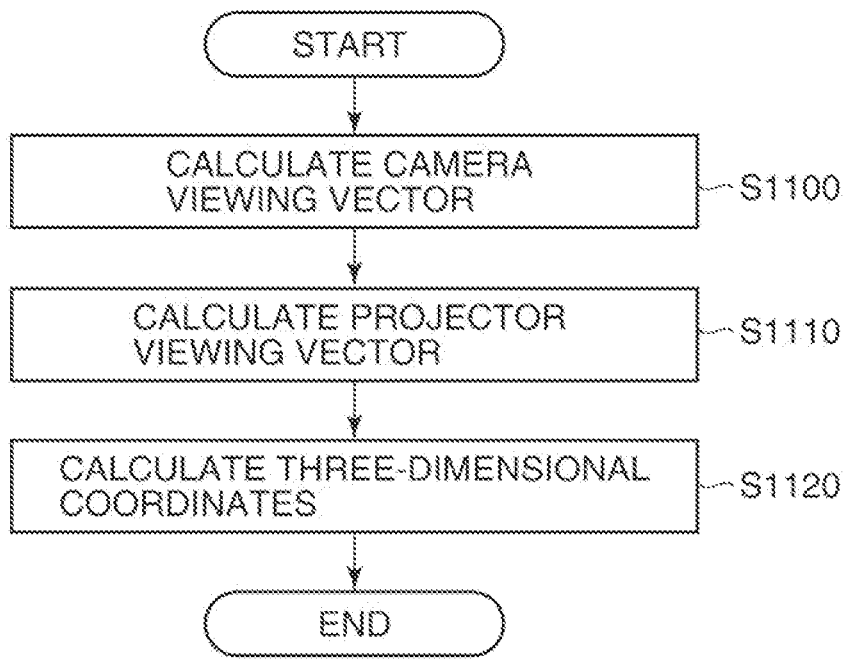
FIG. 7 is a flowchart of a three-dimensional coordinate calculation process executed in a step in FIG. 6.

FIG. 7 is a flowchart of the three-dimensional coordinate calculation process in the step S1020 in FIG. 6. Hereafter, the three-dimensional coordinate calculation process in the step S1020 will be described in detail with reference to FIG. 7.

In a step S1100, the three-dimensional coordinate calculation unit 140 calculates the camera viewing vector connecting between a point on the image data photographed by the camera 100 and the optical center of the camera 100. In this step, as mentioned above, the camera viewing vector from which the lens distortion is eliminated is calculated.

More specifically, the camera viewing vector $x_c$ ($=[x_c y_{c1}]^t$) is calculated using the equations (2) and (3) based on the coordinates ($u_c$, $v_c$) on the photographed image data. First, the three-dimensional coordinate calculation unit 140 calculates the normalized image coordinates ($x'_c$, $y'_c$) with distortion using the equation 3 as expressed by the following equations (5). Note that the step S1100 is an example of processing executed by a first viewing vector calculation unit.

$$x'_c = \frac{u_c - c_{cx}}{f_{cx}} \quad (5)$$

$$y'_c = \frac{v_c - c_{cy}}{f_{cy}}$$

Next, the three-dimensional coordinate calculation unit 140 solves the equations for $x_c$ and $y_c$ which are obtained by substituting the calculated $x'_c$ and $y'_c$ into the equations (2) as the simultaneous equations to thereby calculate the normalized image coordinates $x_c$ and $y_c$ without distortion. Note that these simultaneous equations cannot be analytically solved, and hence the three-dimensional coordinate calculation unit 140 provides initial values of $x_c$ and $y_c$ (e.g. $x'_c$ and $y'_c$), and calculates $x_c$ and $y_c$ by iterative calculation e.g. based on Newton's method. The camera viewing vector $x_c$ is obtained from $x_c$ and $y_c$ calculated as above.

In a step S1110, the three-dimensional coordinate calculation unit 140 calculates the projector viewing vector connecting between a point on the image data of the striped pattern projected by the projector 105 and the optical center of the projector 105. Here, as mentioned above, the projector viewing vector to which the lens distortion is added is calculated. More specifically, the projector viewing vector $x'_p$ ($=[x'_p y'_p 1]^t$) is calculated from the vertical coordinate $v'_p$ of the image data of the striped pattern projected by the projector 105. First, the three-dimensional coordinate calculation unit 140 calculates the normalized image coordinate $y_p$ (without distortion) of the coordinate $v_p$ by the following equation (6). Note that the step S1110 is an example of processing executed by a second viewing vector calculation unit.

$$y_p = \frac{v_p - c_{py}}{f_{py}} \quad (6)$$

The three-dimensional coordinate calculation unit 140 substitutes the equation (6) into the equations (4) to thereby obtain an equation for $x'_p$ and $y'_p$ expressed by the following equation (7):

$$y_p = y'_p\{1+k_{p1}(x'^2_p+y'^2_p)+k_{p2}(x'^2_p+y'^2_p)^2\}+p_{p1}(x'^2_p+3y'^2_p)+2p_{p2}x'_p y'_p \quad (7)$$

On the other hand, to estimate the three-dimensional coordinates based on the principle of triangulation, the camera viewing vector and the projector viewing vector are required to intersect with each other at one point in the three-dimensional space. This condition is referred to as the epipolar constraint, and is expressed by the following equation 8:

$$[x_c \quad y_c \quad 1]E\begin{bmatrix} x'_p \\ y'_p \\ 1 \end{bmatrix} = 0 \quad (8)$$

However, E represents 3×3 matrix called the essential matrix. The essential matrix E is expressed by the following equations (9) using a three-dimensional vector $t=[t_x, t_y, t_z]$ representing the position of the projector 105 in the camera coordinate system, and 3×3 matrix R representing the orientation of the projector 105:

$$R = \begin{bmatrix} r_{11} & r_{12} & r_{13} \\ r_{21} & r_{22} & r_{23} \\ r_{31} & r_{32} & r_{33} \end{bmatrix} \quad (9)$$

$$E = \begin{bmatrix} e_{11} & e_{12} & e_{13} \\ e_{21} & e_{22} & e_{23} \\ e_{31} & e_{32} & e_{33} \end{bmatrix}$$

$$= \begin{bmatrix} 0 & -t_z & t_y \\ t_z & 0 & -t_x \\ -t_y & t_x & 0 \end{bmatrix} R$$

$$= \begin{bmatrix} 0 & -t_z & t_y \\ t_z & 0 & -t_x \\ -t_y & t_x & 0 \end{bmatrix} \begin{bmatrix} r_{11} & r_{12} & r_{13} \\ r_{21} & r_{22} & r_{23} \\ r_{31} & r_{32} & r_{33} \end{bmatrix}$$

The relative position and orientation of the camera 100 and the projector 105 have been calibrated in advance and are known, and hence the E matrix is also known. Further, the camera viewing vector $x_c$ is also known, and hence a linear equation for $x'_p$ and $y'_p$ expressed by the following equation (10) is obtained from the equation (8):

$$ax'_p+by'_p+c=0$$

provided that $$a = x_c e_{11} + y_c e_{21} + e_{31}$$

$$b = x_c e_{12} + y_c e_{22} + e_{32}$$

$$c = x_c e_{13} + y_c e_{23} + e_{33} \quad (10)$$

The three-dimensional coordinate calculation unit 140 can directly calculate the projector viewing vector by using the equations 7 and 10 as the condition of constraint associated with $x'_p$ and $y'_p$, without calculating the provisional three-dimensional coordinates as disclosed in R. J. Valkenburg and A. M. McIvor, "Accurate 3D measurement using a structured light system," Image and Vision Computing, vol. 16, no. 2, pp. 99-110, 1998. Note that ($x'_p$, $y'_p$) geometrically represents the coordinates of a point of intersection between a straight line (epipolar line) expressed by the equation (10) and a curve expressed by the equation (7) on the x-y plane. The three-dimensional coordinate calculation unit 140 solves the equations (7) and (10) as the simultaneous equations for $x'_p$ and $y'_p$ to thereby calculate $x'_p$ and $y'_p$.

Hereafter, a method of calculating $x'_p$ and $y'_p$ will be described in detail. First, the three-dimensional coordinate calculation unit 140 eliminates $y'_p$ in the equation 7 by expressing $y'_p$ by $x'_p$ by the equation (10) to thereby obtain an equation for $x'_p$ expressed by the following equation (11):

$$Ax'^5_p+Bx'^4_p+Cx'^3_p+Dx'^2_p+Ex'_p+F=0$$

provided that $$A = -k_{p2}(ab^4+2a^3b^2+a^5)$$

$$B = -k_{p2}c(b^4+6a^2b^2+5a^4)$$

$$C = -k_{p2}(6ab^2+10a^3)c^2-k_{p1}(ab^4+a^3b^2)$$

$$D = -2p_{p2}ab^4 + p_{p1}(3a^2b^3+b^5) - k_{p2}(2b^2+10a^2)c^3 - k_{p1}(b^4+3a^2b^2)c$$

$$E = -2p_{p2}b^4c + 6p_{p1}ab^3c - 5k_{p2}ac^4 - 3k_{p1}ab^2c^2 - ab^4$$

$$F = 3p_{p1}b^3c^2 - k_{p2}c^5 - k_{p1}b^2c^3 - b^4c - b^5y_p \quad (11)$$

The equation (11) is a fifth-degree equation for $x'_p$. The fifth-degree equation cannot be analytically solved, and hence the three-dimensional coordinate calculation unit 140 calculates $x'_p$ using the following equation (12) shown below. First, the three-dimensional coordinate calculation unit 140 provides an initial value of $x'_p$. For the initial value $x_{p0}'$ of $x'_p$, there is used e.g. a value of $x'_p$ obtained when $y'_p = y_p$ is set in the equation (10).

$$x'_{p0} = \frac{-by_p - c}{a} \quad (12)$$

Next, the three-dimensional coordinate calculation unit 140 linearly approximates a left side of the equation (11) for $x'_p$ in the vicinity of $x'_{p0}$, and sets up an equation satisfying, as expressed by the following equation (13), in which a right side becomes equal to 0 by an infinitesimal change $\Delta x'_p$ of $x'_p$.

$$Ax'^5_{p0} + Bx'^4_{p0} + Cx'^3_{p0} + Dx'^2_{p0} + Ex'_{p0} + F + (5Ax'^4_{p0} + 4Bx'^3_{p0} + 3Cx'^2_{p0} + 2Dx'_{p0} + E)\Delta x'_p = 0 \quad (13)$$

The three-dimensional coordinate calculation unit 140 calculates $\Delta x'_p$ from the equation (13), and corrects $x_{p0}'$ to $x_{p0}' + \Delta x'_p$. The three-dimensional coordinate calculation unit 140 repeats the above-described process, using the obtained $x_{p0}'$ as a new initial value, until the solution converges. The three-dimensional coordinate calculation unit 140 calculates $y'_p$ from the equation 10 by setting the obtained solution as $x'_p$. By thus calculating $x'_p$ and $y'_p$, the projector viewing vector $x'_p$ is obtained. Although in the present embodiment, when calculating $x'_p$ and $y'_p$, $x'_p$ is calculated by eliminating $y'_p$, this is not limitative. The value $y'_p$ may be calculated by eliminating $x'_p$ in the same manner.

In a step S1120, the three-dimensional coordinate calculation unit 140 calculates the three-dimensional coordinates based on the camera viewing vector $X_c$ calculated in the step S1100 and the projector viewing vector $x'_p$ calculated in the step S1110. Each three-dimensional coordinates are determined as the coordinates of a point of intersection between a three-dimensional line as an extension of the camera viewing vector $X_c$ and a three-dimensional line as an extension of the projector viewing vector $x'_p$. The point of intersection between the three-dimensional lines is calculated e.g. in the following manner: The three-dimensional coordinates (X, Y, Z) of a point at a position where the projector viewing vector $x'_p$ is extended $\alpha$ times in the camera coordinate system are expressed by the following equation (14). Note that the step S1120 is an example of processing executed by an three-dimensional coordinate calculation unit.

$$\begin{bmatrix} X \\ Y \\ Z \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} \alpha x'_p \\ \alpha y'_p \\ \alpha \end{bmatrix} + \begin{bmatrix} t_x \\ t_y \\ t_z \end{bmatrix} \quad (14)$$

When a vector connecting this point and the optical center of the camera 100 coincides with the camera viewing vector $X_c$, it is possible to obtain the following equations (15):

$$x_c = \frac{\alpha(r_{11}x'_p + r_{12}y'_p + r_{13}) + t_x}{\alpha(r_{13}x'_p + r_{32}y'_p + r_{33}) + t_x}$$

$$y_c = \frac{\alpha(r_{21}x'_p + r_{22}y'_p + r_{23}) + t_x}{\alpha(r_{31}x'_p + r_{32}y'_p + r_{33}) + t_x} \quad (15)$$

The three-dimensional coordinate calculation unit 140 solves a first one or a second one of the equations (15) for $\alpha$ to thereby calculate $\alpha$ as expressed by the following equation (16):

$$\alpha = \frac{t_x - x_c t_z}{x_c(r_{31}x'_p + r_{32}y'_p + r_{33}) - (r_{11}x'_p + r_{12}y'_p + r_{13})} \quad (16)$$

or $$\alpha = \frac{t_y - y_c t_z}{y_c(r_{31}x'_p + r_{32}y'_p + r_{33}) - (r_{21}x'_p + r_{22}y'_p + r_{23})}$$

Further, the three-dimensional coordinate calculation unit 140 substitutes the calculated $\alpha$ into the equation 11 to thereby calculate the three-dimensional coordinates (X, Y, Z). Note that the method of calculating the three-dimensional coordinates (X, Y, Z) is not limited to this. For example, the three-dimensional coordinates (X, Y, Z) may be directly calculated based on the fact that the normalized image coordinates obtained when the three-dimensional coordinates (X, Y, Z) are projected onto the photographed image data and the image data of the striped pattern are ($x_c$, $y_c$) and ($x'_p$, $y'_p$), respectively. The above-described three-dimensional coordinate calculation process is carried out with respect to all of associations of the two-dimensional coordinates on the photographed image data with the vertical coordinates on the image data of the striped pattern, obtained in the step S1010.

As described above, in the first embodiment, the description has been given of the three-dimensional shape measurement method in which when the three-dimensional shape measurement is performed with projection of striped pattern light, the lens distortion is correctly reflected by estimating the projector viewing vector to which the lens distortion has been added. In this method, it is not necessary to calculate provisional three-dimensional coordinates once as in the conventional method, and hence it is possible to perform the three-dimensional shape measurement which is executed by projecting pattern light of which two-dimensional positions on an image are not uniquely determined, with high accuracy at high speed.

Next, a description will be given of a second embodiment of the present invention. In the above-described first embodiment, the description has been given of calculation of the three-dimensional coordinates using the coefficients (equations (2)) for converting the ideal image coordinates without distortion to the image coordinates with distortion as the parameters indicative of lens distortions of the camera 100 and the projector 105. However, the parameters indicative of the lens distortions are not limited to these. In the second embodiment, a method of calculating the three-dimensional coordinates in a case where the parameters indicative of the lens distortions are coefficients for converting the image coordinates with distortion to the image coordinates without distortion will be described. Note that an information processing apparatus and an image processing system according to the second embodiment are the same in configuration as those shown in FIGS. 1 and 3, and hence description thereof is omitted while using the same reference numerals as those in FIGS. 1 and 3 for the same component elements.

In the second embodiment, the normalized image coordinates (x', y') with distortion for the camera 100 are converted to the normalized image coordinates (x, y) without distortion by the following equations (17):

$$x = x'\{1 + k_1(x'^2 + y'^2) + k_2(x'^2 + y'^2)^2\} + 2p_1 x' y' + p_2(3x'^2 + y'^2)$$

$$y = y'\{1 + k_1(x'^2 + y'^2) + k_2(x'^2 + y'^2)^2\} + p_1(x'^2 + 3y'^2) + 2p_2 x' y' \quad (17)$$

In the case of the projector 105, inversely from the camera 100 to which an image is input through a lens, an image is output through a lens, and hence the relationship between the normalized image coordinates (x', y') with distortion and the normalized image coordinates (x, y) without distortion of the projector 105 is inverse to that of the camera 100. Therefore, the relationship between (x', y') and (x, y) is expressed by the following equations (18):

$$x' = x\{1 + k_1(x^2 + y^2) + k_2(x^2 + y^2)^2\} + 2p_1 xy + p_2(3x^2 + y^2)$$

$$y' = y\{1 + k_1(x^2 + y^2) + k_2(x^2 + y^2)^2\} + p_1(x^2 + 3y^2) + 2p_2 xy \quad (18)$$

Note that similarly to the first embodiment, the distortion model is not limited to this. That is, in the case of the camera 100, any other model may be used insofar as the model expresses the normalized image coordinates (x, y) before adding distortion as a function of the normalized image coordinates (x', y') to which distortion has been added. In the case of the projector 105, any other model may be used insofar as the model expresses the normalized image coordinates (x', y') to which distortion has been added as a function of the normalized image coordinates (x, y) before adding distortion.

The process in the second embodiment is substantially the same as that in the first embodiment, and hence only a method of calculating the camera viewing vector and the projector viewing vector, which is different from that in the first embodiment, will be described.

In the second embodiment, the camera viewing vector is calculated in the following manner: First, the three-dimensional coordinate calculation unit 140 calculates the normalized image coordinates ($x'_c$, $y'_c$) with distortion from the equations (5) from the coordinates ($u_c$, $v_c$) on the image data photographed by the camera 100. Next, the three-dimensional coordinate calculation unit 140 calculates the normalized image coordinates ($x_c$, $y_c$) without distortion using the equations (17) to thereby calculate the camera viewing vector.

Further, in the second embodiment, the project viewing vector is calculated in the following manner: First, the three-dimensional coordinate calculation unit 140 calculates the normalized image coordinate (without distortion) $y_p$ of the coordinate $v_p$ in the vertical direction using the equation (6). Next, the three-dimensional coordinate calculation unit 140 substitutes a result obtained by substituting $y_p$ into the equation (18) into the equation (10) to thereby obtain a fifth-degree equation for $x_p$. Finally, the three-dimensional coordinate calculation unit 140 determines $x_p$ by solving the fifth-degree equation. This fifth-degree equation cannot be analytically solved, and hence $x_p$ is calculated by using the method as described in the first embodiment. The three-dimensional coordinates are calculated by using the same method as provided in the first embodiment based on the camera viewing vector and the projector viewing vector, obtained by the above-described process.

As described above, in the second embodiment, the description has been given of the method of performing the three-dimensional shape measurement while taking into account the distortion of the projector 105 in the case where the parameter indicative of the lens distortion is a coefficient for converting the image coordinates with distortion to the image coordinates without distortion.

In the above-described embodiments, the description has been given of the method of taking into account the lens distortion of the projector 105 in the three-dimensional shape measurement based on the space coding method which illuminates an object with lights different in binary code pattern in time series using the projector 105. However, the three-dimensional shape measurement method is not limited to the space coding method. For example, any other method, such as the phase shift method, may be employed insofar as the method uses the striped pattern light similarly to the space coding method. Further, a method for irradiating a measurement object with light in one-dimensional line pattern, such as laser slit light, may be employed insofar as it is the method for illuminating an object with light in a striped pattern through a lens.

Further, in the above-described embodiments, the description has been given of the case where the direction of the stripes of the striped pattern light projected by the projector 105 is the horizontal direction on the image data of the striped pattern light. However, the pattern light projected by the projector 105 is not limited to the striped pattern light in the horizontal direction, but may be pattern light in any other direction, such as the striped pattern light in the vertical direction. This also applies to the direction of the line of the one-dimensional line pattern light. Calculation of the projector viewing vector in a case where an object is illuminated by the striped pattern light in the vertical direction is performed in the following manner:

First, the three-dimensional coordinate calculation unit 140 calculates the normalized image coordinate (without distortion) $x_p$ of the coordinate $u_p$ of an image projected by the projector 105 in the horizontal direction by the following equation (19):

$$x_p = \frac{u_p - c_{px}}{f_{px}} \quad (19)$$

Next, the three-dimensional coordinate calculation unit 140 substitutes the equation (19) into the first one of the equations (4) to thereby obtain an equation for $x'_p$ and $y'_p$ expressed by the following equation (20):

$$x_p = x'_p\{1 + k_1(x'^2_p + y'^2_p) + k_2(x'^2_p + y'^2_p)^2\} + 2p_1 x'_p y'_p + p_2(3x'^2_p + y'^2_p) \quad (20)$$

Next, similarly to the first embodiment, the three-dimensional coordinate calculation unit 140 calculates $x'_p$ and $y'_p$ by solving the equations (10) and (20) as the simultaneous equations for $x'_p$ and $y'_p$ to thereby calculate the projector viewing vector.

Further, in the above-described embodiments, the model having distortions up to the fifth-order radial and tangential distortions is assumed as the lens distortion model of the projector 105. However, the lens distortion model is not limited to this. For example, a model without a circumferential distortion, or a model having the lower or higher-order radial distortion than the fifth-order radial distortion may be employed. If the order of the lens distortion of the lens distortion model in the radial direction is different, the degree of $x'_p$ in the equation (11) is changed according to the order of distortion. For example, the equation (11) is a third-degree equation for $x'_p$ for a model having distortions up to a third-order distortion, and is a seventh-degree equation for $x'_p$ for a model having distortions up to a seventh-order distortion, and hence it is only required to solve the third-degree or seventh-degree equation may. On the other hand, in a case where there is no tangential distortion, it is possible to obtain similar equations only different in the right side of the equation (12) and hence, it is only required to solve them. That is, even when the lens distortion model is different, by solving equations obtained from the epipolar constraints between the camera 100 and the projector 105 and equations obtained from the lens distortion model as described above, it is possible to calculate the projector viewing vector.

For example, when a model having only distortions in the radial direction up to a third-order distortion is used as the lens distortion model of the projector 105, the equation (7) is transformed into the following equation (21):

$$y_p = y'_p\{1 + k_{p1}(x'^2_p + y'^2_p)\} \quad (21)$$

From the equations (21) and (10), there is obtained a third-degree equation for $x'_p$ expressed by the following equation (22):

$$Gx'^3_p + Hx'^2_p + Ix'_p + J = 0$$

provided that $$G = -k_{p1}(ab^4 + a^3b^2)$$

$$H = -k_{p1}(b^4 + 3a^2b^2)c$$

$$I = -3k_{p1}ab^2c^2 - ab^4$$

$$J = -k_{p1}b^2c^3 - b^4c - b^5 y_p \quad (22)$$

The three-dimensional coordinate calculation unit 140 can calculate the projector viewing vector by calculating $x'_p$ using the equation (22).

According to the above-described embodiments, it is possible to perform the three-dimensional shape measurement using projection of the pattern light which is not uniquely determined in the two-dimensional position on an image with high accuracy at high speed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-084909, filed Apr. 3, 2012, which is hereby incorporated by reference herein in its entirety.

What is claimed is:

1. An information processing apparatus comprising:
    an input unit configured to input image data of a target object, onto which a pattern has been projected by a projection apparatus and which has then been photographed by an imaging apparatus, wherein the pattern varies in luminance only in a predetermined direction;
    an association unit configured to associate a two-dimensional coordinate $(x'_c, y'_c)$ on the image data of the target object with a one-dimensional coordinate $(y_p)$ in the predetermined direction on image data of the pattern based on the input image data;
    a first correction unit configured to obtain a first corrected two-dimensional coordinate $(x_c, y_c)$ on the image data of the target object by correcting the two-dimensional coordinate $(x'_c, y'_c)$ on the image data of the target object based on a first distortion model which expresses an influence of distortion, by a lens of the imaging apparatus, to a reflected light reflected by the target object when the reflected light passes through the lens of the imaging apparatus;
    a first viewing vector-deriving unit configured to derive a first viewing vector which is through the first corrected two-dimensional coordinate $(x_c, y_c)$ on the image data of the target object and an optical center of the imaging apparatus;
    a second correction unit configured to obtain a second corrected two-dimensional coordinate $(x'_p, y'_p)$ on the image data of the pattern based on an equation derived from (i) the one-dimensional coordinate $(y_p)$ in the predetermined direction on the image data of the pattern and (ii) a second distortion model which expresses an influence of distortion, by a lens of the projection apparatus, to an emitted light emitted from a light source of the projection apparatus, when the emitted light passes through the lens of the projection apparatus, and the first viewing vector, wherein the second corrected two-dimensional coordinate $(x'_p, y'_p)$ is obtained directly from the equation without processing of projecting a three-dimensional coordinate onto the image data of the pattern;
    a second viewing vector-deriving unit configured to derive a second viewing vector which is through the second corrected two-dimensional coordinate $(x'_p, y'_p)$ on the image data of the pattern and an optical center of the projection apparatus; and
    an intersection coordinate-deriving unit configured to derive coordinates of a point, in a three-dimensional space, of intersection between the first viewing vector and the second viewing vector.

2. The information processing apparatus according to claim 1, wherein the pattern is a striped pattern image.

3. The information processing apparatus according to claim 2, wherein a direction of stripes of the striped pattern image is a horizontal direction or a vertical direction on the image data of the striped pattern image.

4. The information processing apparatus according to claim 1, wherein the pattern is a line pattern image.

5. The information processing apparatus according to claim 4, wherein a direction of lines of the line pattern image is a horizontal direction or a vertical direction on the image data of the line pattern image.

6. The information processing apparatus according to claim 1, wherein the image data of the pattern comprises multiple patterns for a space coding method or a phase shift method.

7. An information processing method executed by an information processing apparatus, the method comprising:
- inputting image data of a target object, onto which a pattern has been projected by a projection apparatus and which has then been photographed by an imaging apparatus, wherein the pattern varies in luminance only in a predetermined direction;
- associating a two-dimensional coordinate $(x'_c, y'_c)$ on the image data of the target object with a one-dimensional coordinate $(y_p)$ in the predetermined direction on image data of the pattern based on the input image;
- obtaining a first corrected two-dimensional coordinate $(x_c, y_c)$ on the image data of the target object by correcting the two-dimensional coordinate $(x'_c, y'_c)$ on the image data of the target object based on a first distortion model which expresses an influence of distortion, by a lens of the imaging apparatus, to a reflected light reflected by the target object when the reflected light passes through the lens of the imaging apparatus;
- deriving a first viewing vector which is through the first corrected two-dimensional coordinate $(x_c, y_c)$ on the image data of the target object and an optical center of the imaging apparatus;
- obtaining a second corrected two-dimensional coordinate $(x'_p, y'_p)$ on the image data of the pattern based on an equation derived from (i) the one-dimensional coordinate $(y_p)$ in the predetermined direction on the image data of the pattern and (ii) a second distortion model which expresses an influence of distortion, by the lens, to an emitted light emitted from a light source of the projection apparatus, when the emitted light passes through the lens of the projection apparatus, and the first viewing vector, wherein the second corrected two-dimensional coordinate $(x'_p, y'_p)$ is obtained directly from the equation without processing of projecting a three-dimensional coordinate onto the image data of the pattern;
- deriving a second viewing vector which is through the second corrected two-dimensional coordinate $(x'_p, y'_p)$ on the image data of the pattern and an optical center of the projection apparatus; and
- deriving coordinates of a point, in a three-dimensional space, of intersection between the first viewing vector and the second viewing vector.

8. A non-transitory storage medium storing a program for causing a computer to function as each unit of an information processing apparatus, the program executable by the information processing apparatus to execute a method comprising:
- inputting image data of a target object, onto which a pattern has been projected by a projection apparatus and which has then been photographed by an imaging apparatus, wherein the pattern varies in luminance only in a predetermined direction;
- associating a two-dimensional coordinate $(x'_c, y'_c)$ on the image data of the target object with a one-dimensional coordinate $(y_p)$ in the predetermined direction on image data of the pattern based on the input image;
- obtaining a first corrected two-dimensional coordinate $(x_c, y_c)$ on the image data of the target object by correcting the two-dimensional coordinate $(x'_c, y'_c)$ on the image data of the target object based on a first distortion model which expresses an influence of distortion, by a lens of the imaging apparatus, to a reflected light reflected by the target object when the reflected light passes through the lens of the imaging apparatus;
- deriving a first viewing vector which is through the first corrected two-dimensional coordinate $(x_c, y_c)$ on the image data of the target object and an optical center of the imaging apparatus;
- obtaining a second corrected two-dimensional coordinate $(x'_p, y'_p)$ on the image data of the pattern based on an equation derived from (i) the one-dimensional coordinate $(y_p)$ in the predetermined direction on the image data of the pattern and (ii) a second distortion model which expresses an influence of distortion, by the lens, to an emitted light emitted from a light source of the projection apparatus, when the emitted light passes through the lens of the projection apparatus, and the first viewing vector, wherein the second corrected two-dimensional coordinate $(x'_p, y'_2)$ is obtained directly from the equation without processing of projecting a three-dimensional coordinate onto the image data of the pattern;
- deriving a second viewing vector which is through the second corrected two-dimensional coordinate $(x'_p, y'_p)$ on the image data of the pattern and an optical center of the projection apparatus; and
- deriving coordinates of a point, in a three-dimensional space, of intersection between the first viewing vector and the second viewing vector.

9. The apparatus according to claim 1,
wherein the second distortion model is expressed by an equation (1) set forth below:

$$y_p = y'_p\{1 + k_{p1}(x'^2_p + y'^2_p) + k_{p2}(x'^2_p + y'^2_p)^2\} + p_{p1}(x'^2_p + 3y'^2_p) + 2p_{p2}x'_p y'_p \quad (1)$$

wherein an epipolar constraint between the imaging apparatus and the projection apparatus is expressed by an equation (2) set forth below:

$$[x_c \ y_c \ 1] E \begin{bmatrix} x'_p \\ y'_p \\ 1 \end{bmatrix} = 0, \quad (2)$$

and
wherein the second correction unit solves the equation (1) and the equation (2) as simultaneous equations to thereby obtain the second corrected two-dimensional coordinate on the image data of the pattern.

* * * * *